(No Model.)

J. SPYER.
DENTAL SUCTION PLATE FORMER.

No. 331,840. Patented Dec. 8, 1885.

Witnesses.
P. K. McNickee.
G. O. Kramer

Inventor.
Joseph Spyer
By R. S. & A. Lacey
Attys.

United States Patent Office.

JOSEPH SPYER, OF SANTA FÉ, TERRITORY OF NEW MEXICO.

DENTAL SUCTION-PLATE FORMER.

SPECIFICATION forming part of Letters Patent No. 331,840, dated December 8, 1885.

Application filed May 19, 1885. Serial No. 166,054. (No model.)

*To all whom it may concern:*

Be it known that I, JOSEPH SPYER, a citizen of the United States, residing at Santa Fé, in the county of Santa Fé and Territory of New Mexico, have invented certain new and useful Improvements in Surface Suction-Plates for Dental Casts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates, principally, to improvements in suction-forming sheets for dental plates.

It consists of a thin sheet having a series of nodules or projections formed thereon, with cavities or depressions in the apex thereof, said sheet, or a portion thereof, being used as a former to produce a corresponding surface for dental casts, all as more fully shown and hereinafter set forth and claimed.

Figure 1:
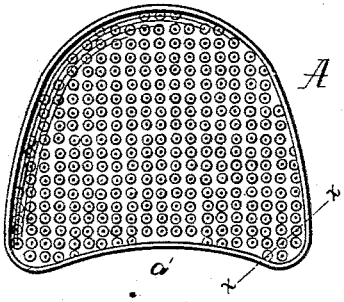
Figure 2:
Figure 3:
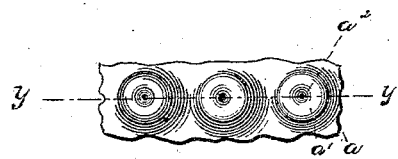
Figure 4:
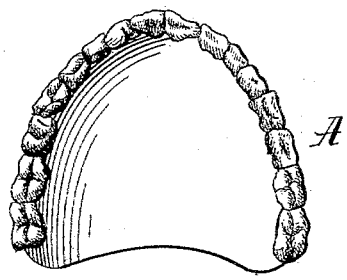
Figure 5:
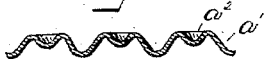

In the drawings, Figure 1 is the suction side of a dental plate having my improvements applied thereto. Fig. 2 is a section on an enlarged scale; and Fig. 3 is a plan or enlarged scale of a portion of the sheet, showing the form of the projections. Fig. 4 is the under side of an ordinary dental plate; and Fig. 5 is a section of a metallic sheet stamped into form.

A sheet of block-tin, $a$—such as is used in dental surgery—is stamped, cast, or otherwise formed so as to provide on one side a series of projections, $a'$, which may be round, oval, or of any other suitable form that will not cause pain when applied to the gums. In the top of these projections a depression or cavity, $a^2$, is formed, having smooth sides, as shown. These depressions are preferably made in the form of an inverted cone, which form gives the best results. Other shapes might be given to cavities, but the conical shape causes no irritation to the gums, and is therefore used in preference to all others.

The metallic sheet constructed with the projections thereon, as hereinbefore described, is cut in desired shapes, just the same as the plain sheet is cut to form a surface-plate to be applied to the suction side of the dental cast. It is applied to and may become an integral part of the cast in the same manner as the ordinary plain surface-plate is applied, all of which is well known in dentistry; but I prefer to use such sheets, or portions thereof, simply as a mold to give the requisite form to the surface of the cast, from which it is afterward removed, leaving the surface of the cast, as more clearly shown in Fig. 2.

While sheet metal is preferable for the purpose specified, it is manifest that other substances may be equally as well employed.

The salient point of the invention is to produce a sheet having a series of rounded nodules or projections formed thereon, with cavities or depressions in the apex thereof, which may be cut in any desired shape, and used as a mold or former to produce a corresponding suction-surface for dental casts.

A plate or cast provided with the suction-surface hereinbefore described will set easily in the mouth, will hold firmly in place, and will not cause irritation to the gums. It has a special adaptation for use on those plates without teeth, used to place on the gums, as is well known in dentistry.

Having thus described my invention, what I claim, and desire to secure by Letters Patent, is—

The herein-described surface-suction former for dental casts, consisting of a thin sheet having a series of projections formed thereon, and a cavity in the apex of such projections, as and for the purposes hereinbefore specified.

In testimony whereof I affix my signature in presence of two witnesses.

JOSEPH SPYER.

Witnesses:
CHARLES A. BALDWIN,
EDWIN B. SEWARD.